US009860042B2

(12) United States Patent
Lim et al.

(10) Patent No.: US 9,860,042 B2
(45) Date of Patent: Jan. 2, 2018

(54) METHOD AND APPARATUS FOR TRANSMITTING RANGING SIGNAL IN WIRELESS COMMUNICATION SYSTEM

(75) Inventors: Chi-Woo Lim, Suwon-si (KR); Jeong-Ho Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 13/207,709

(22) Filed: Aug. 11, 2011

(65) Prior Publication Data

US 2012/0039277 A1 Feb. 16, 2012

(30) Foreign Application Priority Data

Aug. 12, 2010 (KR) .................. 10-2010-0077845

(51) Int. Cl.
*H04W 4/00* (2009.01)
*H04L 5/00* (2006.01)
*H04L 27/26* (2006.01)

(52) U.S. Cl.
CPC .......... *H04L 5/0053* (2013.01); *H04L 5/0066* (2013.01); *H04L 5/0094* (2013.01); *H04L 27/261* (2013.01)

(58) Field of Classification Search
CPC ............. H04W 72/0453; H04L 5/0053; H04L 5/0007; H04L 5/0023; H04L 5/0039; H04L 5/0041; H04L 5/0044; H04L 5/0048
USPC .................................................. 370/310–350
See application file for complete search history.

(56) References Cited

U.S. PATENT DOCUMENTS

| 8,897,219 B2 * | 11/2014 | Lee ................... H04W 72/04 370/208 |
| 2005/0271012 A1 | 12/2005 | Agrawal et al. |
| 2010/0103895 A1 | 4/2010 | Cho et al. |
| 2010/0272043 A1 * | 10/2010 | Cho et al. ................ 370/329 |

(Continued)

FOREIGN PATENT DOCUMENTS

| JP | 2012521711 A | 9/2012 |
| KR | 10-2010-0047109 A | 5/2010 |

(Continued)

OTHER PUBLICATIONS

"Part 16: Air Interface for Broadband Wireless Access Systems", IEEE P802.16m/D7, Jul. 29, 2010.

*Primary Examiner* — Ricky Ngo
*Assistant Examiner* — Wei-Po Kao
(74) *Attorney, Agent, or Firm* — Jefferson IP Law, LLP

(57) ABSTRACT

A method of a mobile station for transmitting a ranging signal in a wireless communication system which supports Fractional Frequency Reuse (FFR) and an apparatus for performing the method are provided. The method includes receiving information of ranging resource allocation, from a base station, based on the information of the ranging resource allocation, determining a cell identifier and a Frequency Partition (FP) location for uplink control channels, determining a subband index for the ranging resource allocation based on the cell identifier and a number of subbands allocated to the FP location for the uplink control channels, and transmitting a ranging signal based on the subband index for the ranging resource allocation. Thus, interference to a neighboring cell may be reduced in the ranging channel transmission.

32 Claims, 8 Drawing Sheets

(56) References Cited

U.S. PATENT DOCUMENTS

2012/0039272 A1    2/2012  Lee et al.
2012/0113955 A1*  5/2012  Cho et al. ..................... 370/330

FOREIGN PATENT DOCUMENTS

| KR | 10-2010-0081905 A | 7/2010 |
|---|---|---|
| WO | 2010/123241 A2 | 10/2010 |

\* cited by examiner

METHOD AND APPARATUS FOR TRANSMITTING RANGING SIGNAL IN WIRELESS COMMUNICATION SYSTEM

PRIORITY

This application claims the benefit under 35 U.S.C. §119 (a) of a Korean patent application filed in the Korean Intellectual Property Office on Aug. 12, 2010, and assigned Serial No. 10-2010-0077845, the entire disclosure of which is hereby incorporated by reference.

BACKGROUND OF THE INVENTION

1. Field of the Invention

The present invention relates to ranging signal transmission in a wireless communication system. More particularly, the present invention relates to a method and an apparatus for transmitting a ranging signal by considering Fractional Frequency Reuse (FFR) in a wireless communication system.

2. Description of the Related Art

In a wireless communication system, a mobile station obtains uplink timing and STation IDentification (STID) through a ranging procedure. The ranging procedure generally commences when the mobile station transmits a ranging signal. To transmit the ranging signal, it is necessary to know a location of a resource for transmitting the ranging signal.

According to Institute of Electrical and Electronics Engineers (IEEE)802.16m, the location of the resource for transmitting the ranging signal may be obtained as follows. A format of the ranging signal to transmit and a subframe location are acquired based on a SuperFrame Header (SFH), and a subband location is determined by an IDcell value of a cell carrying the current ranging signal. The location of the subband $I_{SB}$ is determined using mod(IDcell,$Y_{SB}$) which is a function of a total number of subbands $Y_{SB}$ and IDcell used in the current cell.

In a multi-carrier Orthogonal Frequency Division Multiple Access (OFDMA) system, resources are allocated based on a subchannel including subcarriers. A plurality of users divides and shares the subcarriers, thus obtaining a multi-user diversity gain in the frequency domain. Orthogonal Frequency Division Multiplexing (OFDM)/OFDMA broadband wireless communication system reuses the same frequency in every cell, applies Adaptive Modulation and Coding (AMC) according to a receive signal intensity and interference between neighboring cells, and thus maximizes throughput. However, in a system with a frequency reuse factor of 1, the interference between the neighboring cells is severe in the boundary of the cell or the sector and the yield is lowered. The system is also subject to service outage. To enhance the performance in the cell boundary with the frequency reuse factor of 1, a Fractional Frequency Reuse (FFR) scheme under consideration divides the whole frequency band into a plurality of Frequency Partitions (FPs), adequately deploys the FP areas, limits the power level of some FP areas in each cell, and thus alleviates the same channel interference between the neighboring cells. When a serving cell prefers and uses some FP areas, other neighboring cells control their power level to reduce the interference level below a certain level with respect to the FP areas preferred by the serving cell.

As stated above, the mobile station in the IEEE 802.16m system determines the subband location $I_{SB}$ of the ranging channel based on the function mod(IDcell, $Y_{SB}$) of the total number of subbands $Y_{SB}$ and IDcell used in the current cell. However, the resource location determination for transmitting the ranging signal does not take account of the FFR. In the FFR, the power level of some FP areas of the neighboring cell is limited, whereas the subband of the ranging channel may be selected in the whole frequency band. As a result, the mobile station in the corresponding cell boundary, as transmitting the ranging signal, may cause interference in the neighboring cell.

What is needed is a method and an apparatus for reducing the interference to the neighboring cell when the ranging signal is transmitted in the wireless communication system which supports the FFR.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for transmitting a ranging signal in a wireless communication system supporting Fractional Frequency Reuse (FFR).

Another aspect of the present invention is to provide a method and an apparatus for reducing interference to a neighboring cell when a ranging signal is transmitted in a wireless communication system which supports FFR.

According to an aspect of the present invention, a method of a mobile station for transmitting a ranging signal in a wireless communication system which supports FFR is provided. The method includes receiving information of ranging resource allocation, from a base station, based on the information of the ranging resource allocation, determining a cell identifier and a Frequency Partition (FP) location for uplink control channels, determining a subband index for the ranging resource allocation based on the cell identifier and a number of subbands allocated to the FP location for the uplink control channels, and transmitting a ranging signal based on the subband index for the ranging resource allocation.

According to another aspect of the present invention, a method of a base station for transmitting a ranging signal in a wireless communication system which supports FFR is provided. The method includes broadcasting information of ranging resource allocation, based the information of the ranging resource allocation, determining a cell identifier and a FP location for uplink control channels, determining a subband index for the ranging resource allocation based on the cell identifier and a number of subbands allocated to the FP location for the uplink control channels, and receiving a ranging signal from a mobile station based on the subband index for the ranging resource allocation.

According to another aspect of the present invention, a method of a mobile station for transmitting a ranging signal in a wireless communication system is provided. The method includes determining whether FFR operates, when the FFR operates, determining a cell identifier and a FP location for uplink control channels based on the information of the ranging resource allocation, determining a subband index for ranging resource allocation based on the cell identifier and a number of subbands allocated to the FP location for the uplink control channels, and transmitting a ranging signal based on the subband index for the ranging resource allocation.

According to another aspect of the present invention, an apparatus of a mobile station for transmitting a ranging signal in a wireless communication system which supports FFR is provided. The apparatus includes a receiver for receiving information of ranging resource allocation, from a base station, a controller for determining a cell identifier and a FP location for uplink control channels based on the information of the ranging resource allocation, and for determining a subband index for the ranging resource allocation based on the cell identifier and a number of subbands allocated to the FP location for the uplink control channels, and a transmitter for transmitting a ranging signal based on the subband index for the ranging resource allocation.

According to another aspect of the present invention, an apparatus of a base station for transmitting a ranging signal in a wireless communication system which supports FFR is provided. The apparatus includes a transmitter for broadcasting information of ranging resource allocation, a controller for determining a cell identifier and a FP location for uplink control channels based on the information of the ranging resource allocation, and for determining a subband index for the ranging resource allocation based on the cell identifier and a number of subbands allocated to the FP location for the uplink control channels, and a receiver for receiving a ranging signal from a mobile station based on the subband index for the ranging resource allocation.

According to another aspect of the present invention, an apparatus of a mobile station for transmitting a ranging signal in a wireless communication system is provided. The apparatus includes a controller for determining whether FFR operates, for, when the FFR operates, determining a cell identifier and a FP location for uplink control channels based on the information of the ranging resource allocation, and for determining a subband index for ranging resource allocation based on the cell identifier and a number of subbands allocated to the FP location for the uplink control channels, and a transmitter for transmitting a ranging signal based on the subband index for the ranging resource allocation.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
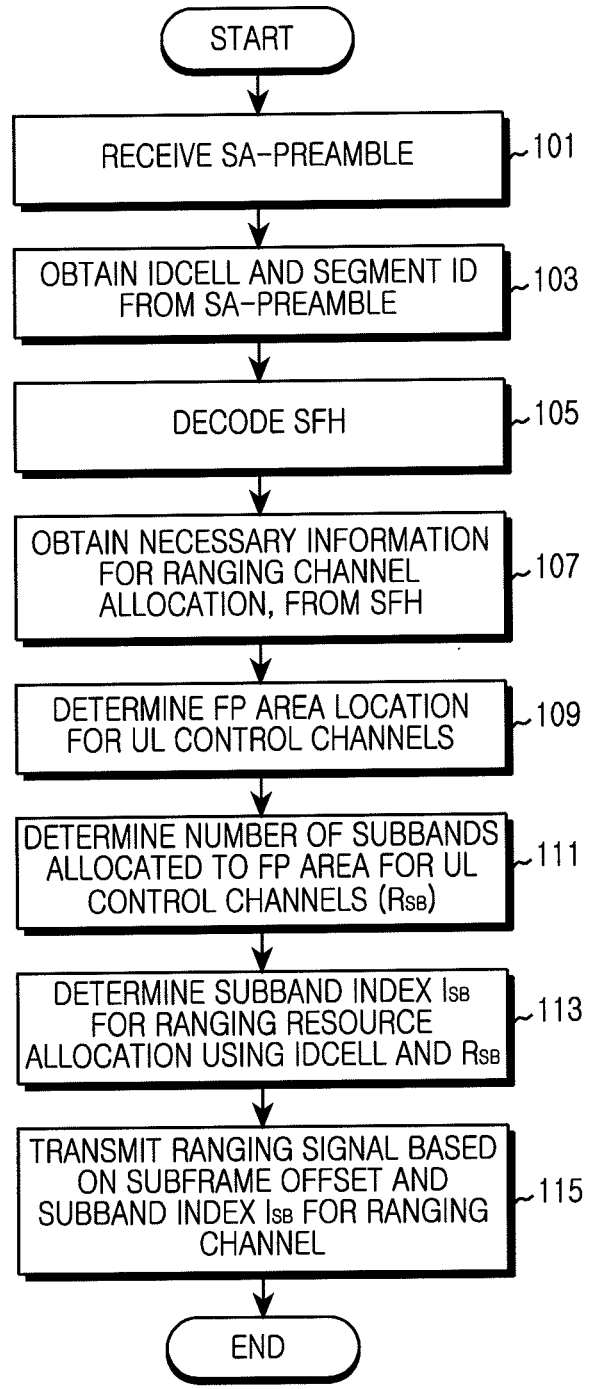
FIG. 1 is a flowchart of operations of a mobile station for transmitting a ranging signal in a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein may be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for transmitting a ranging signal in a wireless communication system. Hereinafter, an Institute of Electrical and Electronics Engineers (IEEE) 802.16m communication system is described as an example.

In the IEEE 802.16m communication system, the ranging signal is transmitted over one or three subframes in the time axis and over one subband in the frequency axis. A timing for transmitting the ranging signal is known through a SubFrame Header (SFH), and the subband for transmitting the ranging signal is obtained from IDcell. The IEEE 802.16m communication system may employ Fractional Frequency Reuse (FFR). In this case, each cell is given a Frequency Partition (FP) area to use in the corresponding cell (hereafter, referred to as a boosted frequency partition or a power-boosted reuse 3 area) among reuse 3 FP and performs scheduling to experience as little as possible interference on the FP in other neighboring cells. The frequency location (i.e., the subband index) of the current ranging signal is determined without considering the FFR. Hence, when the FFR is applied and the location of the subband determined based on IDcell is not in the reuse 3 FP area of the corresponding cell, the ranging signal of the mobile station in the boundary of the corresponding cell may create interference in the other cell.

As stated above, when the ranging channel is allocated to the subband of the FR area, rather than to the reuse 1 area or the power-boosted reuse 3 area, considerable interference with the neighboring cell may occur. Accordingly, such allocation should be avoided. The allocation should also be fulfilled without additional signaling overhead as in the allocation method of the related art. Exemplary embodiments of the present invention provide two methods. One method calculates the subband index by adopting $R_{SB}$ instead of the existing $Y_{SB}$. $Y_{SB}$ denotes the total number of the subbands allocated to the cell and $R_{SB}$ denotes the number of the subbands allocated to the reuse 1 or the power-boosted reuse 3 area. $I_{SB}$=mod(IDcell,$Y_{SB}$) is modified to $I_{SB}$=mod(IDcell, $R_{SB}$) where $Y_{SB}$=Σ(LSB-CRU, $FP_i$)/4 (i=0, 1, 2, 3) and RSB=($L_{SB}$-CRU,$FP_i$+LSB-CRU, $FP_k$)/4, k=segment_ID+1. LSB-CRU,$FP_i$ denotes the number of subband Contiguous Resource Units (CRUs) allocated to the $FP_i$ area and segment_ID denotes a segment value of the corresponding cell. The location of the subband to which the ranging channel may be allocated may be restricted to the reuse 1 and the power-boosted reuse 3 area.

The other method uses frequency partition location for UpLink (UL) control channels which is a parameter of the SFH identifying locations of a current UL feedback channel and a Bandwidth Request (BR) channel. At present, this field is 1 bit. When the field value is 0b0, it signifies that the reuse 1 area includes the UL feedback channel and the BR channel. When the field value is 0b1, it signifies that the power-boosted reuse 3 area includes the UL feedback channel and the BR channel.

Exemplary embodiments of the present invention provide a method for applying this field value to the $I_{SB}$ calculation without additional overhead increase. $I_{SB}$=mod(IDcell, $R_{SB}$) where $R_{SB}$ denotes the number of the subbands allocated to the reuse 1 area or the power-boosted reuse 3 area determined by the field value of the frequency partition location for UL control channels of the SFH. Operations of the mobile station according to the two methods are described below with respect to FIGS. 1, 2, and 3.

FIG. 1 illustrates operation of a mobile station for transmitting a ranging signal in a wireless communication system according to an exemplary embodiment of the present invention.

Referring to FIG. 1, the mobile station receives a Secondary Advanced (SA)-preamble from a base station in step 101 and determines IDcell and segment_ID (0,1,2) based on the received SA-preamble in step 103. IDcell, which is the cell identifier, is derived from the SA-preamble and determined based on segment_ID.

In step 105, the mobile station decodes the SFH. The SFH carries essential system parameters and system configuration information. The SFH is positioned in the first subframe of the super frame.

In step 107, the mobile station obtains necessary information for the ranging channel allocation from the received SFH. For example, the information may include frequency partition location for UL control channels, such as UL feedback channel and BR channel, and subframe offset $O_{SF}$ of the ranging channel. The information includes the total number of the subbands allocated in the current cell or the number of the subbands in each FP when the FFR is applied.

In the initial ranging procedure, the information includes format information (see FIG. 5) of the ranging channel. In various implementations, the number of the subbands allocated in each FP may be changed to the number of the subband CRUs allocated in each FP (LSB-CRU,$FP_i$). The number of the subbands allocated in each FP is determined as LSB-CRU, $FP_i$/4 (i=0, 1, 2, 3). Herein, LSB-CRU,$FP_i$ denotes the number of the subband CRUs allocated in the $FP_i$ area. $FP_0$ is the FP area of the reuse 1, and $FP_1$ $FP_2$ or $FP_3$ is the FP area of the power-boosted reuse 3. The FP area of the power-boosted reuse 3 of the corresponding cell is determined as segment ID+1.

In step 109, the mobile station determines the FP area location for the UL control channels based on the field value of the frequency partition location for UL control channels of the SFH. In step 111, the mobile station determines the number of the subbands allocated to the FP area for the UL control channels. For example, when the 1-bit field value of the frequency partition location for UL control channels is 0b0, the UL control channels such as UL feedback channel and BR channel are allocated to the reuse 1 area. When the field value is 0b1, the UL feedback channel and BR channel are allocated to the power-boosted reuse 3 area.

In step 113, the mobile station determines the subband index $I_{SB}$ (0, . . . , $R_{SB}$ −1) for the ranging resource allocation using IDcell derived from the SA-preamble and the number of the subbands allocated to the FP area for the UL control channels. The subband index $I_{SB}$ for the ranging resource allocation is defined based on Equation 1 or Equation 2. Equation 1 is used for the ranging channel for non-synchronized mobile stations, and Equation 2 is used for the ranging channel for synchronized mobile stations.

$$I_{SB}=\text{mod}(IDcell, R_{SB}) \quad (1)$$

mod denotes a modulo operation, IDcell denotes the cell identifier derived from the SA-preamble, and $R_{SB}$ denotes the number of the subbands allocated to the FP area for the UL control channels.

$$I_{SB}=\text{mod}(IDcell+1, R_{SB}) \quad (2)$$

In step 115, the mobile station transmits the ranging signal using the subband value $I_{SB}$ used for the ranging channel transmission and the subframe value $O_{SF}$, used for the ranging channel transmission.

In FIG. 1, the subband $I_{SB}$ used for the ranging channel transmission is determined using the value of the frequency partition location for UL control channels of the SFH. In various implementations, the corresponding FP area may be indicated by adding a separate indication field. The subband $I_{SB}$ is determined based on the total number of the subbands in the indicated FP area.

Figure 2:
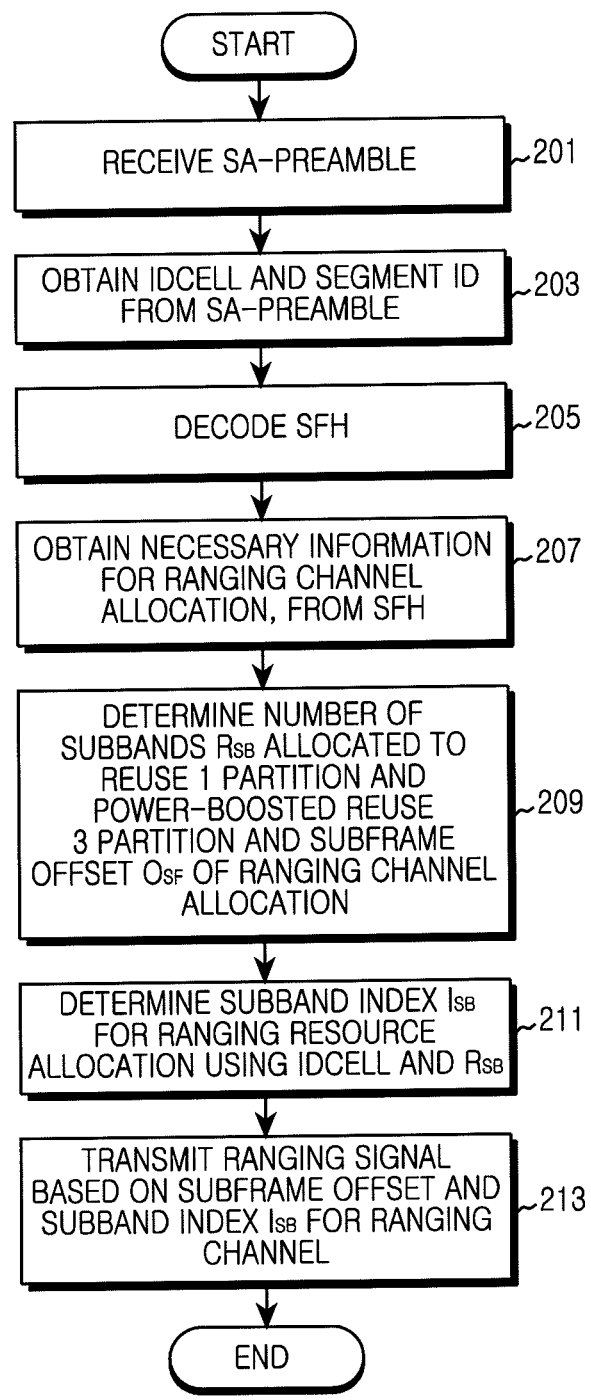
FIG. 2 is a flowchart of operations of a mobile station for transmitting a ranging signal in a wireless communication system according to an exemplary embodiment of the present invention.

FIG. 2 illustrates operation of a mobile station for transmitting a ranging signal in a wireless communication system according to an exemplary embodiment of the present invention.

Referring to FIG. 2, the mobile station receives the SA-preamble from the base station in step 201 and determines IDcell and segment_ID (0,1,2) based on the received SA-preamble in step 203. IDcell, which is the cell identifier, is derived from the SA-preamble and determined based on segment_ID.

In step 205, the mobile station decodes the SFH. The SFH carries the essential system parameters and the system configuration information. The SFH is positioned in the first subframe of the super frame.

In step 207, the mobile station obtains the necessary information for the ranging channel allocation from the received SFH. For example, the information may include the total number of the subbands in the reuse 1 FP area and the power-boosted reuse 3 FP area. The information also includes the subframe offset $O_{SF}$ of the ranging channel. The information includes the total number of the subbands allocated in the current cell or the number of the subbands in each FP when the FFR is used. In the initial ranging procedure, the information includes the format information (see FIG. 5) of the ranging channel. The ranging channel format is classified into a non-synchronized ranging channel and a synchronized ranging channel. FIG. 5 depicts the non-synchronized ranging channel format.

In various implementations, the number of the subbands allocated in each FP may be replaced by the number of the subband CRUs allocated in each FP (LSB-CRU, FPi). The number of the subbands allocated in each FP is determined as LSB-CRU,FPi/4 (i=0, 1, 2, 3). LSB-CRU,FPi denotes the number of the subband CRUs allocated in the FPi area. FP0 is the FP area of the reuse 1, and FP1, FP2, or FP3 is the FP area of the power-boosted reuse 3. The FP area of the power-boosted reuse 3 of the corresponding cell is determined as segment ID+1.

In step 209, the mobile station determines the total number of the subbands $R_{SB}$ in the reuse 1 FP area and the power-boosted reuse 3 FP area, and the subframe offset $O_{SF}$ of the ranging channel allocation based on the SFH.

In step 211, the mobile station determines the subband index $I_{SB}$ (0, . . . , $R_{SB}$ −1) for the ranging resource allocation using IDcell derived from the SA-preamble and the total number of the subbands $R_{SB}$ of the reuse 1 FP area and the power-boosted reuse 3 FP area. The subband index $I_{SB}$ for the ranging resource allocation is defined based on Equation 3 or Equation 4. Equation 3 is used for the ranging channel for the non-synchronized mobile stations, and Equation 4 is used for the ranging channel for the synchronized mobile stations.

$$I_{SB}=\text{mod}(\text{IDcell},R_{SB}) \qquad (3)$$

mod denotes the modulo operation, IDcell denotes the cell identifier derived from the SA-preamble, and $R_{SB}$ denotes the number of the subbands allocated to the reuse 1 FP area and the power-boosted reuse 3 FP area.

$$I_{SB}=\text{mod}(\text{IDcell}+1,R_{SB}) \qquad (4)$$

In step 213, the mobile station transmits the ranging signal using the subband value $I_{SB}$ used for the ranging channel transmission and the subframe value $O_{SF}$ used for the ranging channel transmission.

While most of the operations of FIG. 1 and FIG. 2 are substantially the same, a difference lies in that the mobile station determines which FP includes the subbands of the ranging channel through the frequency partition location for UL control channels based on the SFH and calculates $I_{SB}$ solely using the number of the subbands allocated to the corresponding FP. When the FFR is operated through the two methods, the neighboring cell interference is not caused by the location of the subbands carrying the ranging channel.

Figure 3:
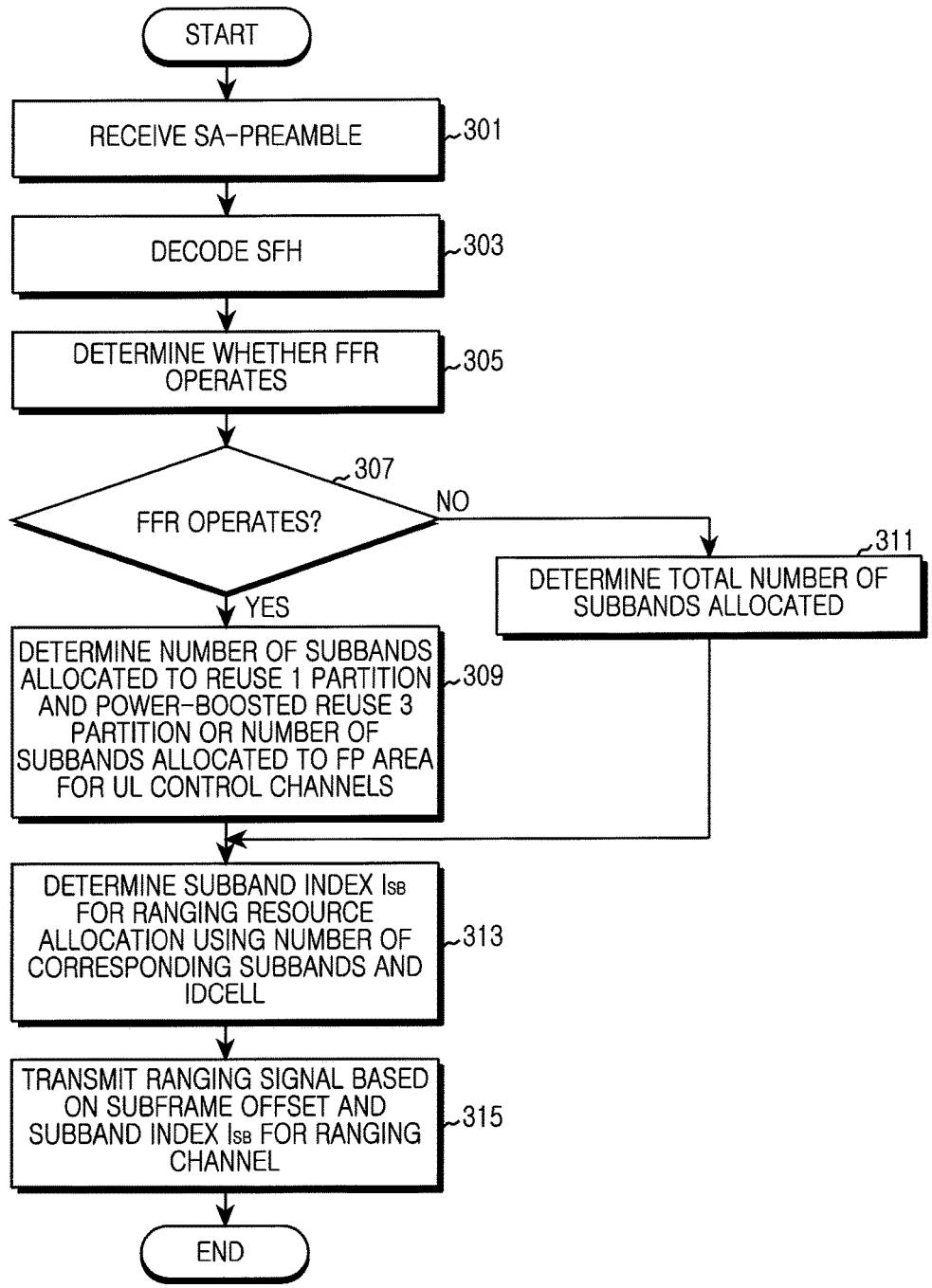
FIG. 3 is a flowchart of operations of a mobile station for transmitting a ranging signal in a wireless communication system according to an exemplary embodiment of the present invention.

FIG. 3 is a flowchart of operations of a mobile station for transmitting a ranging signal in a wireless communication system according to an exemplary embodiment of the present invention.

Referring to FIG. 3, the mobile station receives the SA-preamble from the base station and determines IDcell and segment_ID (0,1,2) based on the SA-preamble in step 301. IDcell, which is the cell identifier, is derived from the SA-preamble and determined based on segment_ID. IDcell matches the SA-preamble.

In step 303, the mobile station decodes the SFH. The SFH carries the essential system parameters and the system configuration information. The SFH is positioned in the first subframe of the super frame.

In step 305, the mobile station determines based on the received SFH whether the FFR is operated. When the FFR is operated in step 307, the mobile station confirms, based on the SFH, the total number of the subbands in the reuse 1 FP area and the power-boosted reuse 3 FP area, or the total number of the subbands in the FP area (either the reuse 1 FP area or the power-boosted reuse 3 FP area) allocated the UL control channels in step 309. In contrast, when the FFR is not operated in step 307, the mobile station determines the total number of the subbands in the whole FP area in step 311.

In step 313, the mobile station determines the subband index $I_{SB}$ for the ranging resource allocation using the total number of the subbands $R_{SB}$ in the reuse 1 FP area and the power-boosted reuse 3 FP area, the total number of the subbands $R_{SB}$ in the FP area allocated the UL control channels, or the total number of the subbands in the whole FP area, and IDcell derived from the SA-preamble.

In step 315, the mobile station transmits the ranging signal using the subband value $I_{SB}$ used for the ranging channel transmission and the subframe value $O_{SF}$ used for the ranging channel transmission.

Figure 4:
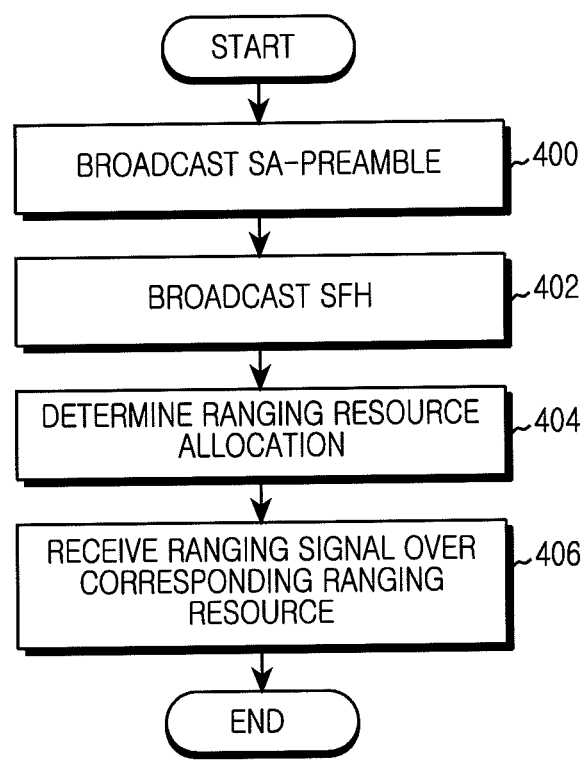
FIG. 4 is a flowchart of operations of a base station for transmitting a ranging signal in a wireless communication system according to an exemplary embodiment of the present invention.

FIG. 4 illustrates operation of a base station for transmitting a ranging signal in a wireless communication system according to an exemplary embodiment of the present invention.

Referring to FIG. 4, the base station broadcasts the SA-preamble in step 400 and broadcasts the SFH in step 402. The SA-preamble is determined by IDcell and segment_ID (0,1,2). The SFH carries the essential system parameters and the system configuration information. For example, the SFH includes the information necessary for the ranging channel allocation, e.g., the frequency partition location for UL control channels such as UL feedback channel and BR channel, the subframe offset $O_{SF}$ of the ranging channel, the total number of the subbands allocated to the current cell or the number of the subbands of each FP when the FFR is applied, and the format information of the ranging channel.

In step 404, the base station determines the ranging resource allocation location by taking account of the FFR. The subframe information $O_{SF}$ of the ranging channel is carried by the SFH from the base station to the mobile station. The base station does not directly transmit the subband information of the ranging channel to the mobile station. Since the subbands of the ranging channel are determined based on the total number of the subbands $R_{SB}$ in the reuse 1 FP area and the power-boosted reuse 3 FP area, the total number of the subbands $R_{SB}$ in the FP area allocated the UL control channels, or the total number of the subbands in the whole FP area, and IDcell derived from the SA-preamble, the base station and the mobile station may implicitly determine the subbands of the ranging channel.

In step 406, the base station receives the ranging signal from corresponding mobile stations at the confirmed ranging resource allocation location. Mobile stations in the cell transmit the ranging signal in competition with other mobile stations.

Figure 5A:
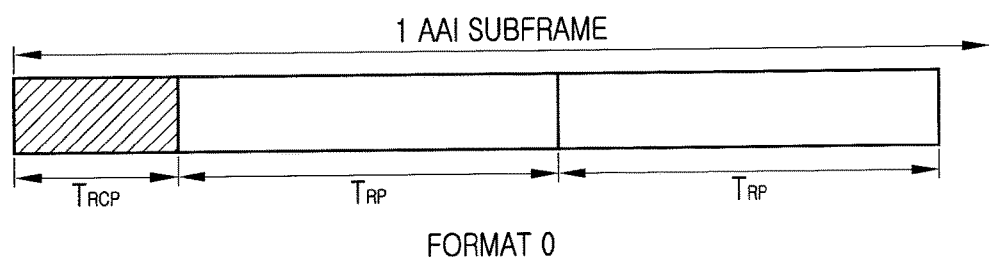
FIGS. 5A and 5B are a diagram of non-synchronized ranging channel allocation in one or more subframes according to an exemplary embodiment of the present invention.
Figure 5B:
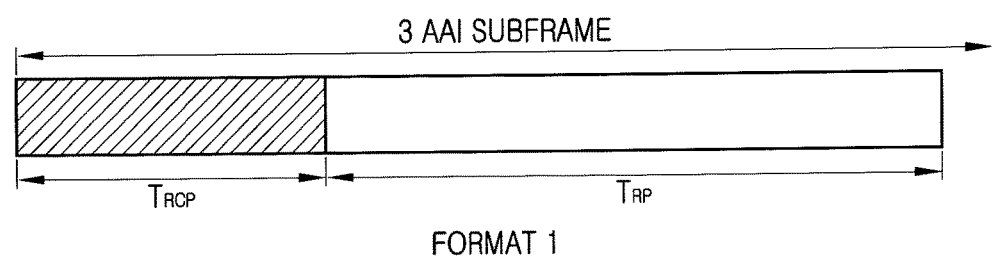

FIGS. 5A and 5B illustrate non-synchronized ranging channel allocation in one or more subframes according to an exemplary embodiment of the present invention.

Referring to FIGS. 5A and 5B, the non-synchronized ranging channel is used for the initial network entry. The physical non-synchronized ranging channel includes a ranging preamble or a ranging code. $T_{RP}$ is determined according to a subcarrier spacing, and $T_{RCP}$ is a ranging cyclic prefix.

The physical non-synchronized ranging channel occupies the bandwidth corresponding to one subband.

The physical non-synchronized ranging channel is allocated to one or three subframes. Format 0 is used when the physical non-synchronized ranging channel is allocated to one subframe, and Format 1 is used when the physical non-synchronized ranging channel is allocated to three subframes.

Figure 6:
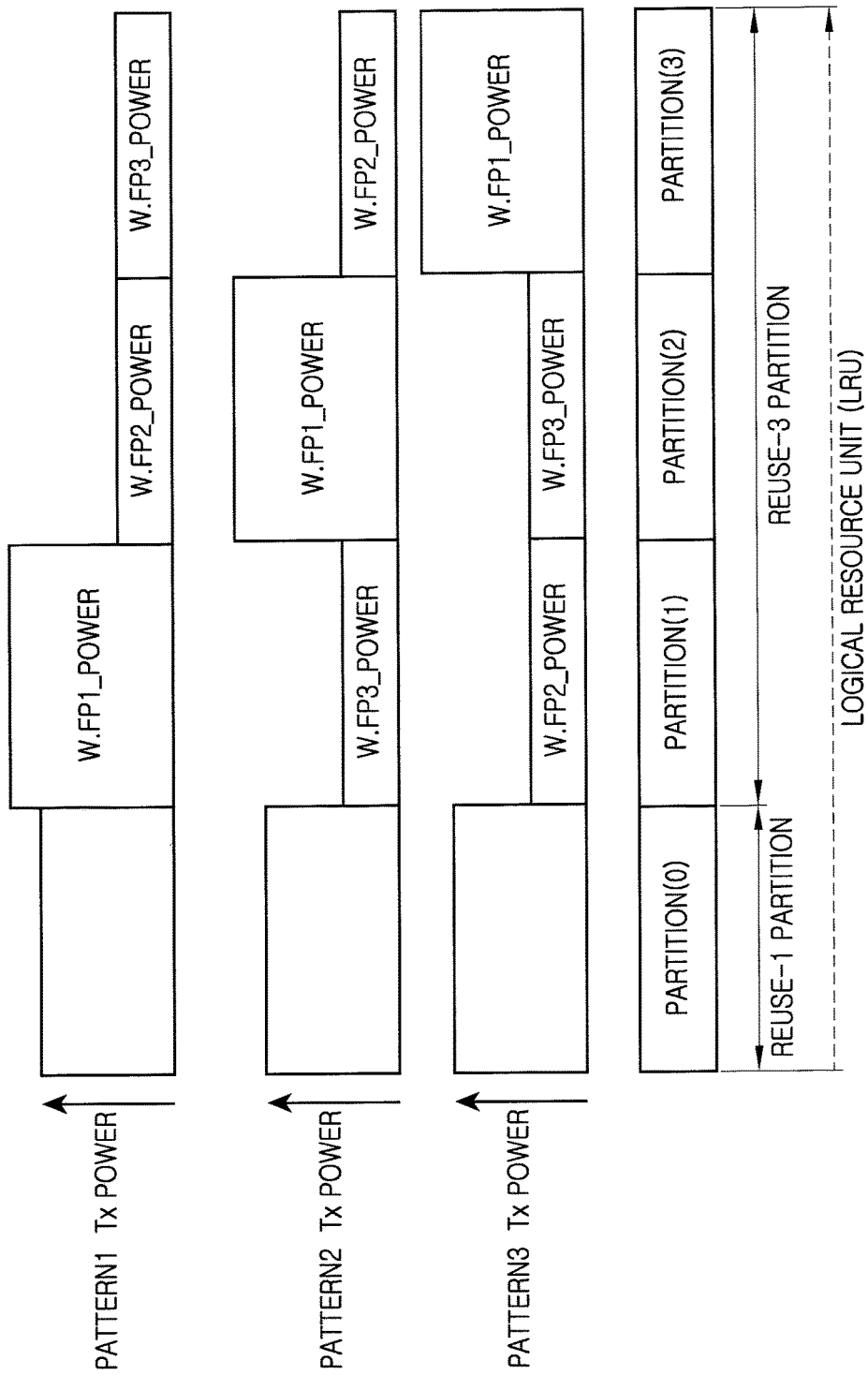
FIG. 6 is a diagram of Fractional Frequency Reuse (FFR) for a scenario with reuse 3 according to an exemplary embodiment of the present invention.

FIG. 6 illustrates a concept of FFR for a scenario with reuse 3 according to an exemplary embodiment of the present invention.

Referring to FIG. 6, a system bandwidth is divided into four FPs including FP0 through FP3, FP0 is used as the reuse 1 partition, and FP1, FP2, and FP3 are used as the reuse 3 partitions.

In pattern1, the power level of the FP1 is higher than that of the FP2 and the FP3. In pattern2, the power level of the FP2 is higher than that of the FP1 and the FP3. In pattern3, the power level of the FP3 is higher than that of the FP1 and the FP2.

Since each cell utilizes the reuse 3 partitions of the different pattern, each cell may restrict the interference with the neighboring cell during the corresponding FP. For example, a first cell may use the reuse 3 partitions of the pattern1, a second cell may use the reuse 3 partitions of the pattern2, and a third cell may use the reuse 3 partitions of the pattern3. The first cell has priority in the FP1 area and a higher power level than the FP2 and the FP3. In contrast, as the second cell and the third cell have a low power level in the FP1 area, the FP1 area of the first cell maintains a permissible interference level. Likewise, the second cell has priority in the FP2 area and a higher power level than the FP1 and the FP3. As the first cell and the third cell have a low power level in the FP2 area, the FP2 area of the second cell maintains a permissible interference level. The second cell has priority in the FP2 area and a higher power level than the FP1 and the FP3. The third cell has priority in the FP3 area and a higher power level than the FP1 and the FP2. As the first cell and the second cell have a low power level in the FP3 area, the FP3 area of the third cell maintains a permissible interference level. Hereafter, the FP1 area of the first cell, the FP2 area of the second cell, and the FP3 area of the third cell are referred to as a boosted frequency partition or a power-boosted reuse 3 area.

Figure 7:
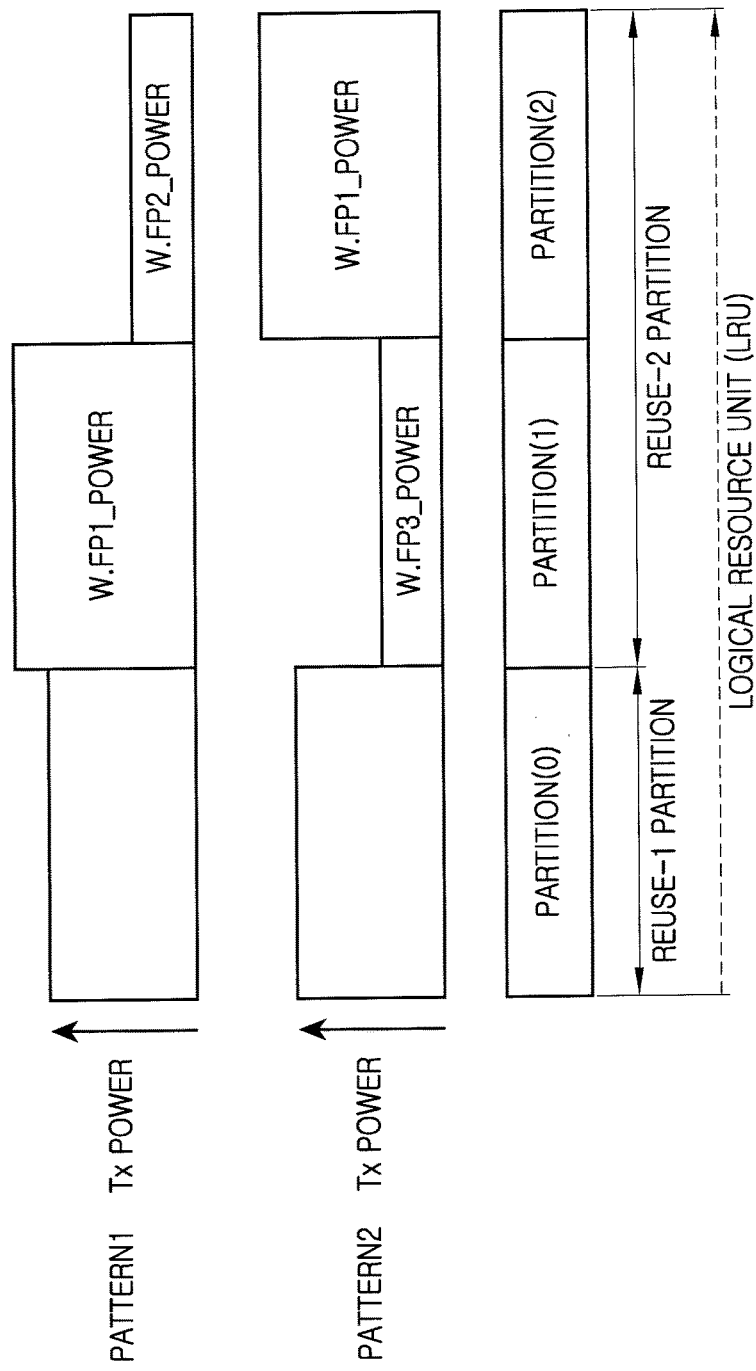
FIG. 7 is a diagram of FFR for a scenario with reuse 2 according to an exemplary embodiment of the present invention.

FIG. 7 depicts FFR for a scenario with reuse 2 according to an exemplary embodiment of the present invention.

Referring to FIG. 7, the system bandwidth is divided into three FPs including FP0, FP1, and FP2. FP0 is used as the reuse 1 partition, and FP1 and FP2 are used as the reuse 3 partitions.

In pattern1, the power level of the FP1 is higher than that of the FP2. In pattern2, the power level of the FP2 is higher than that of the FP1 among the reuse 3 partitions. In pattern1, the boosted frequency partition is the FP1 area. In pattern2, the boosted frequency partition is the FP2 area.

Figure 8:
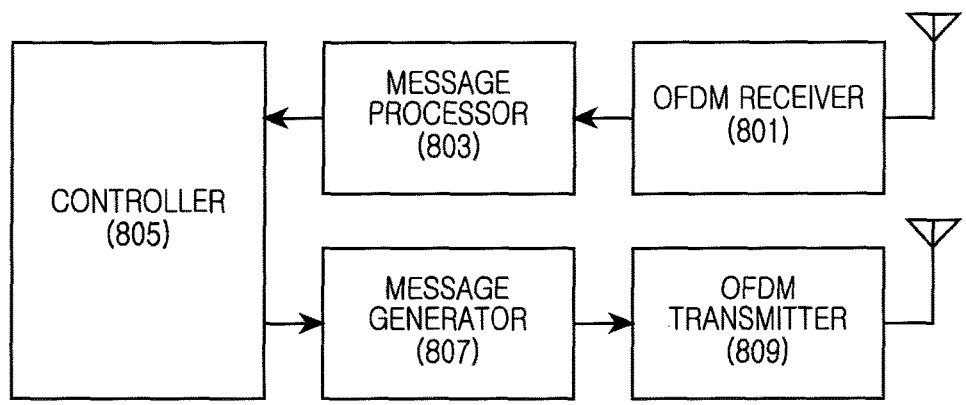
FIG. 8 is a block diagram of an apparatus for transmitting a ranging signal in a wireless communication system according to an exemplary embodiment of the present invention.

FIG. 8 is a block diagram of an apparatus for transmitting a ranging signal in a wireless communication system according to an exemplary embodiment of the present invention. The apparatus may be the base station or the mobile station.

Referring to FIG. 8, the apparatus includes an OFDM receiver 801, a message processor 803, a controller 805, a message generator 807, and an OFDM transmitter 809. The apparatus may include additional units not shown here for clarity. Similarly, two or more of the above units may be integrated into a single component. While various units shown in FIG. 8 may be implemented as hardware, the units may also be implemented as a combination of hardware and software. It would also be apparent to a person of ordinary skill that some units shown in FIG. 8 would need to be implemented at least partially as a hardware component in order to carry out the functions of those units.

The OFDM receiver 801 converts a Radio Frequency (RF) signal received via an antenna into a baseband analog signal, and converts the analog signal into sample data. The OFDM receiver 801 converts the sample data into frequency-domain data through Fast Fourier Transform (FFT), and selects and outputs data of subcarriers to actually receive from the frequency-domain data. The OFDM receiver 801 demodulates and decodes the data at a predefined modulation level (Modulation and Coding Scheme (MCS) level) and outputs the demodulated and decoded data to the message processor 803.

The message processor 803 decomposes a control message output from the OFDM receiver 801 and provides results to the controller 805. For example, the message processor 803 provides the controller 805 with the necessary information for the ranging channel allocation contained in the SFH, for example, the frequency partition location for UL control channels such as UL feedback channel and BR channel, the subframe offset $O_{SF}$ of the ranging channel, the total number of the subbands allocated to the current cell or the number of the subbands in each FP when the FFR is applied, and the format information of the ranging channel.

The controller 805 processes the information output from the message processor 803, generates information to transmit, and outputs the generated information to the message generator 807. In addition, the controller 805 controls the ranging procedure by determining the subbands and the subframes of the ranging channel based on the necessary information for the ranging channel allocation.

As for the operations of the mobile station for transmitting the ranging signal, the controller 805 receives the SA-preamble and the SFH from the OFDM receiver 801 and determines IDcell and segment_ID (0,1,2) based on the received SA-preamble. The controller 805 obtains the essential system parameters and the system configuration information from the SFH. The SFH includes the frequency partition location for UL control channels such as UL feedback channel and BR channel, the subframe offset $O_{SF}$ of the ranging channel, the total number of the subbands allocated in the current cell or the number of the subbands in each FP when the FFR is applied, and the format information (see FIG. 5) of the ranging channel.

The controller 805 locates the FP area for the UL control channels based on the field value of the frequency partition location for UL control channels of the SFH, and determines the number of the subbands $R_{SB}$ allocated to the FP area for the UL control channels. For example, when the 1-bit field value of the frequency partition location for UL control channels is 0b0, the UL control channels such as UL feedback channel and BR channel are allocated to the reuse 1 area. When the field value is 0b1, the UL feedback channel and the BR channel are allocated to the power-boosted reuse 3 area.

The controller 805 determines the subband index $I_{SB}$ (0, . . . , $R_{SB}$ −1) for the ranging resource allocation using IDcell derived from the SA-preamble and the number of the subbands $R_{SB}$ allocated to the FP area for the UL control channels. Alternatively, the controller 805 determines the subband index for the ranging resource allocation using the total number of the subbands in the reuse 1 FP area and the power-boosted reuse 3 FP area.

For the operations of the mobile station for transmitting the ranging signal, the controller 805 may determines whether the FFR is operated using the SFH. When the FFR is operated, the controller 805 determines the total number of the subbands in the reuse 1 FP area and the power-boosted reuse 3 FP area or the total number of the subbands in the FP area allocated the UL control channels (the reuse 1 FP area or the power-boosted reuse 3 FP area). When the FFR is not operated, the controller 805 determines the total number of the subbands in the whole FP area.

The controller 805 determines the subband index $I_{SB}$ for the ranging resource allocation using the total number of the subbands $R_{SB}$ in the reuse 1 FP area and the power-boosted reuse 3 FP area of the SFH, the total number of the subbands $R_{SB}$ in the FP area allocated the UL control channels, or the total number of the subbands in the whole FP area, and IDcell derived from and the SA-preamble.

The message generator 807 generates a message with the information fed from the controller 805 and outputs the generated message to the OFDM transmitter 809 of the physical layer. For example, the message generator 809 generates the SFH including the necessary information for the ranging channel allocation, for example, the frequency partition location for UL control channels such as UL feedback channel and BR channel, the subframe offset $O_{SF}$ of the ranging channel, the total number of the subbands allocated to the current cell or the number of the subbands in each FP when the FFR is applied, and the format information of the ranging channel. The message generator 807 receives the ranging code from the controller 805 and generates a ranging message.

The OFDM transmitter 809 encodes and modulates the data output from the message generator 807 at the predefined modulation level (MCS level). The OFDM transmitter 809 outputs sample data (OFDM symbols) by applying Inverse FFT (IFFT) to the modulated symbols. The OFDM transmitter 809 converts the sample data into an analog signal, converts the analog signal into an RF signal, and transmits the RF signal over an antenna.

For example, the OFDM transmitter 809 transmits the ranging signal based on the subbands $I_{SB}$ and the subframe information $O_{SF}$ of the ranging channel output from the controller 805.

As constructed above, the controller 805, which is a protocol controller, controls the message processor 803 and the message generator 807. The controller 805 may function as the message processor 803 and the message generator 807. They are separately illustrated to distinguish various exemplary functions of the present invention, not to limit the scope of the invention. In exemplary implementations, the controller 805 may process all or part of the functions of the message processor 803 and the message generator 807.

The controller 805 receives necessary information for the protocol processing from the corresponding component of the physical layer, or issues a control signal to the corresponding component of the physical layer. For example, the controller 805 may issue the control signal for controlling the subcarrier allocation scheme (or the subchannel allocation scheme) of the OFDM transmitter 809, or receive the receive signal intensity information (e.g., SA-preamble, SINR, RSSI, and the like) from the physical layer.

As set forth above, by limiting to select the subbands of the ranging channel in the reuse 1 area and the power-boosted reuse 3 area, the interference to the neighboring cell may be reduced in the ranging channel transmission.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a mobile station in a wireless communication system, the method comprising:
   identifying, by at least one processor in the mobile station, a frequency partition among a plurality of frequency partitions;
   determining, by the at least one processor, a subband among a plurality of subbands included in the frequency partition based on a cell identifier and a number of subbands allocated for the frequency partition; and
   transmitting, by a transmitter in the mobile station, a ranging signal on the determined subband,
   wherein the number of the subbands allocated for the frequency partition is determined based on a number of subband contiguous resource units (CRUs) allocated to an FPi location corresponding to a reuse 1 partition or a power-boosted reuse 3 partition,
   wherein an index of the subband is determined with a modulo operation, and
   wherein the number of subband CRUs is a multiple of the subbands allocated for the frequency partition.

2. The method of claim 1, wherein the subband is determined by the following equation:

$$I_{SB} = \text{mod}(\text{IDcell}, R_{SB})$$

wherein $I_{SB}$ denotes the index of the subband, mod denotes a modulo operation, IDcell denotes the cell identifier, and $R_{SB}$ denotes the number of the subbands allocated for the frequency partition.

3. The method of claim 2, wherein $R_{SB}$ is determined by the following equation:

$$R_{SB} = L_{SB\text{-}CRU, FP_i}/4$$

wherein $L_{SB\text{-}CRU,FP_i}$ denotes the number of subband contiguous resource units (CRUs) allocated to the $FP_i$ location.

4. The method of claim 1, further comprising:
   based on information of the ranging resource allocation received from a base station, obtaining, by the at least one processor, a transmission point of the ranging signal.

5. The method of claim 1, wherein the cell identifier is derived from a preamble received from a base station.

6. The method of claim 1, further comprising:
   determining, by the at least one processor, whether fractional frequency reuse (FFR) operates.

7. The method of claim 6, further comprising:
   when the FFR is not supported, determining, by the at least one processor, a subband based on a cell identifier and a total number of subbands.

8. The method of claim 1, further comprising:
   receiving, by a receiver in the mobile station, information of ranging resource allocation, from a base station,
   wherein the identifying of the frequency partition among the plurality of frequency partitions comprises identifying the frequency partition among the plurality of frequency partitions based on the information of ranging resource allocation.

9. The method of claim 8, wherein the information of ranging resource allocation comprises a superframe header (SFH) indicating the frequency partition among the plurality of frequency partitions.

10. A method of operating a base station in a wireless communication system, the method comprising:
identifying, by at least one processor in the base station, a frequency partition among a plurality of frequency partitions;
determining, by the at least one processor, a subband among a plurality of subbands included in the frequency partition based on a cell identifier and a number of subbands allocated for the frequency partition; and
receiving, by a receiver in the base station, a ranging signal transmitted from a mobile station on the determined subband,
wherein the number of the subbands allocated for the frequency partition is determined based on a number of subband contiguous resource units (CRUs) allocated to an FPi location corresponding to a reuse 1 partition or a power-boosted reuse 3 partition,
wherein an index of the subband is determined with a modulo operation, and
wherein the number of subband CRUs is a multiple of the subbands allocated for the frequency partition.

11. The method of claim 10, wherein the subband is determined by the following equation:

$$I_{SB} = \mathrm{mod}(\mathrm{IDcell}, R_{SB})$$

wherein $I_{SB}$ denotes the index of the subband, mod denotes a modulo operation, IDcell denotes the cell identifier, and $R_{SB}$ denotes the number of the subbands allocated for the frequency partition.

12. The method of claim 11, wherein $R_{SB}$ is determined by the following equation:

$$R_{SB} = L_{SB\text{-}CRU,\ FP_i}/4$$

wherein $L_{SB\text{-}CRU,\ FP_i}$ denotes the number of subband contiguous resource units (CRUs) allocated to the $FP_i$ location.

13. The method of claim 10, further comprising:
based on information of the ranging resource allocation received from a base station, obtaining, by the at least one processor, a transmission point of the ranging signal.

14. The method of claim 10, wherein the cell identifier is derived from a preamble received from a base station.

15. The method of claim 10, further comprising:
broadcasting, by a transmitter in the base station, information of ranging resource allocation,
wherein the identifying of the frequency partition among the plurality of frequency partitions comprises identifying the frequency partition among the plurality of frequency partitions based on the information of ranging resource allocation.

16. The method of claim 15, wherein the information of ranging resource allocation comprises a superframe header (SFH) indicating the frequency partition among the plurality of frequency partitions.

17. An apparatus of a mobile station in a wireless communication system, the apparatus comprising:
a memory including one or more programs configured to be executed by at least one processor;
the at least one processor being configured to:
identify a frequency partition among a plurality of frequency partitions, and
determine a subband among a plurality of subbands included in the frequency partition based on a cell identifier and a number of subbands allocated for the frequency partition; and
a transmitter configured to transmit a ranging signal on the determined subband,
wherein the number of the subbands allocated for the frequency partition is determined based on a number of subband contiguous resource units (CRUs) allocated to an FPi location corresponding to a reuse 1 partition or a power-boosted reuse 3 partition,
wherein an index of the subband is determined with a modulo operation, and
wherein the number of subband CRUs is a multiple of the subbands allocated for the frequency partition.

18. The apparatus of claim 17, wherein the subband is determined by the following equation:

$$I_{SB} = \mathrm{mod}(\mathrm{IDcell}, R_{SB})$$

wherein $I_{SB}$ denotes the index of the subband, mod denotes a modulo operation, IDcell denotes the cell identifier, and $R_{SB}$ denotes the number of the subbands allocated for the frequency partition.

19. The apparatus of claim 18, wherein $R_{SB}$ is determined by the following equation:

$$R_{SB} = L_{SB\text{-}CRU,\ FP_i}/4$$

wherein $L_{SB\text{-}CRU,\ FP_i}$ denotes the number of subband contiguous resource units (CRUs) allocated to the $FP_i$ location.

20. The apparatus of claim 17, wherein the at least one processor obtains a transmission point of the ranging signal based on information of the ranging resource allocation received from a base station.

21. The apparatus of claim 17, wherein the cell identifier is derived from a preamble received from a base station.

22. The apparatus of claim 17, wherein the at least one processor is further configured to determine whether fractional frequency reuse (FFR) operates.

23. The apparatus of claim 22, wherein, when the FFR is not supported, the at least one processor determines a subband based on a cell identifier and a total number of subbands.

24. The apparatus of claim 17, further comprising:
a receiver configured to receive information of ranging resource allocation, from a base station,
wherein the at least one processor is configured to identify the frequency partition among the plurality of frequency partitions based on the information of ranging resource allocation.

25. The apparatus of claim 24, wherein the information of ranging resource allocation comprises a superframe header (SFH) indicating the frequency partition among the plurality of frequency partitions.

26. An apparatus of a base station in a wireless communication system, the apparatus comprising:
a memory including one or more programs configured to be executed by at least one processor;
the at least one processor being configured to:
identify a frequency partition among a plurality of frequency partitions, and
determine a subband among a plurality of subbands included in the frequency partition based on a cell identifier and a number of subbands allocated for the frequency partition; and a receiver configured to receive a ranging signal transmitted from a mobile station on the determined subband, wherein the number of the subbands allocated for the frequency partition is determined based on a number of subband contiguous resource units (CRUs) allocated to an FPi location corresponding to a reuse 1 partition or a power-boosted reuse 3 partition, wherein an index of the subband is determined with a modulo operation, and wherein the number of subband CRUs is a multiple of the subbands allocated for the frequency partition.

27. The apparatus of claim 26, wherein the subband is determined by the following equation:

$$I_{SB}=\mathrm{mod}(\mathrm{IDcell}, R_{SB})$$

wherein $I_{SB}$ denotes the index of the subband, mod denotes a modulo operation, IDcell denotes the cell identifier, and $R_{SB}$ denotes the number of the subbands allocated for the frequency partition.

28. The apparatus of claim 27, wherein $R_{SB}$ is determined by the following equation:

$$R_{SB}=L_{SB\text{-}CRU, FP_i}/4$$

wherein $L_{SB\text{-}CRU, FP_i}$ denotes the number of subband contiguous resource units (CRUs) allocated to the $FP_i$ location.

29. The apparatus of claim 26, wherein the at least one processor obtains a transmission point of the ranging signal based on information of the ranging resource allocation.

30. The apparatus of claim 26, wherein the cell identifier is derived from a preamble.

31. The apparatus of claim 26, further comprising:
a transmitter configured to broadcast information of ranging resource allocation,
wherein the at least one processor is configured to identify the frequency partition among the plurality of frequency partitions based on the information of ranging resource allocation.

32. The apparatus of claim 31, wherein the information of ranging resource allocation comprises a superframe header (SFH) indicating the frequency partition among the plurality of frequency partitions.

* * * * *